United States Patent
Hase et al.

(10) Patent No.: US 6,969,341 B2
(45) Date of Patent: Nov. 29, 2005

(54) ENGINE DECELERATION CONTROL SYSTEM

(75) Inventors: Takamitsu Hase, Kanagawa (JP); Tomohiko Takahashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/681,273

(22) Filed: Oct. 9, 2003

(65) Prior Publication Data

US 2004/0077459 A1    Apr. 22, 2004

(30) Foreign Application Priority Data

Oct. 21, 2002  (JP) .............................. 2002-306204

(51) Int. Cl.⁷ .............................................. B60K 41/04
(52) U.S. Cl. .......................... 477/110; 477/71; 477/73; 477/92; 477/93; 477/107; 477/111; 477/183; 477/187; 477/203; 477/206; 123/320; 123/327; 701/110
(58) Field of Search .............................. 477/71, 73, 92, 477/93, 107, 110, 111, 183, 187, 203, 206, 477/904; 123/320, 327; 701/54, 70, 110

(56) References Cited

U.S. PATENT DOCUMENTS

| | | | | |
|---|---|---|---|---|
| 4,123,903 A | * | 11/1978 | Hayashi | 60/277 |
| 4,146,000 A | * | 3/1979 | Hattori et al. | 123/682 |
| 4,491,115 A | * | 1/1985 | Otobe et al. | 123/493 |
| 4,508,074 A | * | 4/1985 | Yamato et al. | 123/327 |
| 4,938,199 A | * | 7/1990 | Sato et al. | 123/585 |
| 5,287,773 A | * | 2/1994 | Nakawaki et al. | 477/92 |
| 5,557,519 A | * | 9/1996 | Morita | 701/1 |
| 5,934,247 A | | 8/1999 | Hashimoto et al. | |

FOREIGN PATENT DOCUMENTS

JP    11-148402 A    6/1999

* cited by examiner

Primary Examiner—Charles A. Marmor
Assistant Examiner—David D. Le
(74) Attorney, Agent, or Firm—Foley & Lardner LLP

(57) ABSTRACT

An engine deceleration control system for an internal combustion engine of a vehicle is arranged to prohibit correcting an air quantity supplied to the engine when an elapsed time period from a moment of turning off of an accelerator of the engine is within a first predetermined time period, or when an elapsed time period from a moment of turning off of a lockup clutch of a torque converter is within a second predetermined time period or when a shifting of a transmission connected to the engine is being executed, and to cancel prohibiting the correction of the supplied air quantity when a braking operation is executed.

10 Claims, 6 Drawing Sheets

ENGINE DECELERATION CONTROL SYSTEM

BACKGROUND OF THE INVENTION

The present invention relates to an engine deceleration control system for an internal combustion engine.

For the purpose of improving fuel consumption of an internal combustion engine, there is a trend of expanding a fuel cut range during engine deceleration, and this expansion of the fuel cut range therefore affects the durability against engine stall. U.S. Pat. No. 5,934,247 (≈JP-A-11-148402) discloses an engine deceleration control device which detects a decreasing variation of engine speed during a deceleration of an engine and corrects a supplied air quantity toward an increased side. More specifically, the engine deceleration control device is arranged to firmly prevent the drop of engine speed during a radial engine deceleration by increasing the increased correction quantity of the supplied air quantity according to the increase of the engine deceleration.

SUMMARY OF THE INVENTION

However, in case that the supplied air quantity is controlled on the basis of the engine deceleration as described above, there is a tendency that the engine deceleration control device inappropriately determines an engine speed drop due to the releasing of an accelerator pedal or an engine speed drop due to upshift just after the releasing of the accelerator pedal, which does not generate the engine stall, as a radical deceleration. This inappropriate determination invites an unnecessary increase of the supplied air quantity which invites the increase of injected fuel quantity, and consequently degrades the fuel consumption.

It is therefore an object of the present invention to provide an improved engine deceleration control system which achieves both of improving fuel consumption and preventing engine stall by preventing an unnecessary increase of supplied air quantity in case that there is no risk of engine stall.

An aspect of the present invention resides in an engine deceleration control system which is for an internal combustion engine of a vehicle and comprises a controller. The controller is arranged to detect a deceleration of the engine on the basis of an engine speed, to correct an air quantity supplied to the engine on the basis of the deceleration when the engine is decelerated, to prohibit correcting the air quantity for a first predetermined time period from a moment when a state of an accelerator of the engine is changed from an operative state to an inoperative state, and to cancel prohibiting the correction of the air quantity when a braking system of the vehicle is put in an operative state.

Another aspect of the present invention resides An engine deceleration control system for an internal combustion engine of a vehicle, which comprises an engine speed detector for detecting an engine speed of the engine, an air quantity control device for controlling an air quantity supplied to the engine, an accelerator operation detector for detecting an operating state of an accelerator of the engine, a brake operation detector for detecting that a brake pedal is depressed and a controller connected to the engine speed detector, the air quantity control device and the acceleration operation detector and a brake operation detector. The controller is arranged to detect an engine deceleration on the basis of a variation of the engine speed, to correct the air quantity on the basis of the engine deceleration, to prohibit correcting the air quantity when one of first, second and third conditions is satisfied where the first condition is a condition that an elapsed time period from a moment of turning off of an accelerator of the engine is within a first predetermined time period, the second condition is a condition that an elapsed time period from a moment of turning off of a lockup clutch of a torque converter is within a second predetermined time period, and the third condition is a condition that a shifting of an transmission connected to the engine is executed, and to cancel prohibiting the correction of the supplied air quantity when a braking operation is executed.

A further aspect of the present invention resides in an engine deceleration control system for an internal combustion engine which comprises deceleration detecting means for detecting a deceleration of the engine on the basis of an engine speed of the engine, air quantity correcting means for correcting an air quantity supplied to the engine on the basis of the deceleration when the engine is decelerated, correction prohibiting means for prohibiting the correction of the air quantity during a predetermined time period from a moment that an accelerator is put in an Off state, and correction-prohibiting canceling means for canceling the correction prohibition when a braking operation is executed.

A further aspect of the present invention resides in a method of controlling a deceleration of an internal combustion engine. The method comprises an operation for detecting a deceleration of the engine on the basis of a drop quantity of an engine speed of the engine, an operation for correcting an air quantity supplied to the engine on the basis of the deceleration when the engine is decelerated, an operation for prohibiting correcting the air quantity during a predetermined time period from a moment that an engine accelerator is pun in an Off state, and an operation for canceling prohibiting the correction when a braking operation is executed.

The other objects and features of this invention will become understood from the following description with reference to the accompanying drawings.

DETAILED DESCRIPTION OF THE INVENTION

Figure 1:
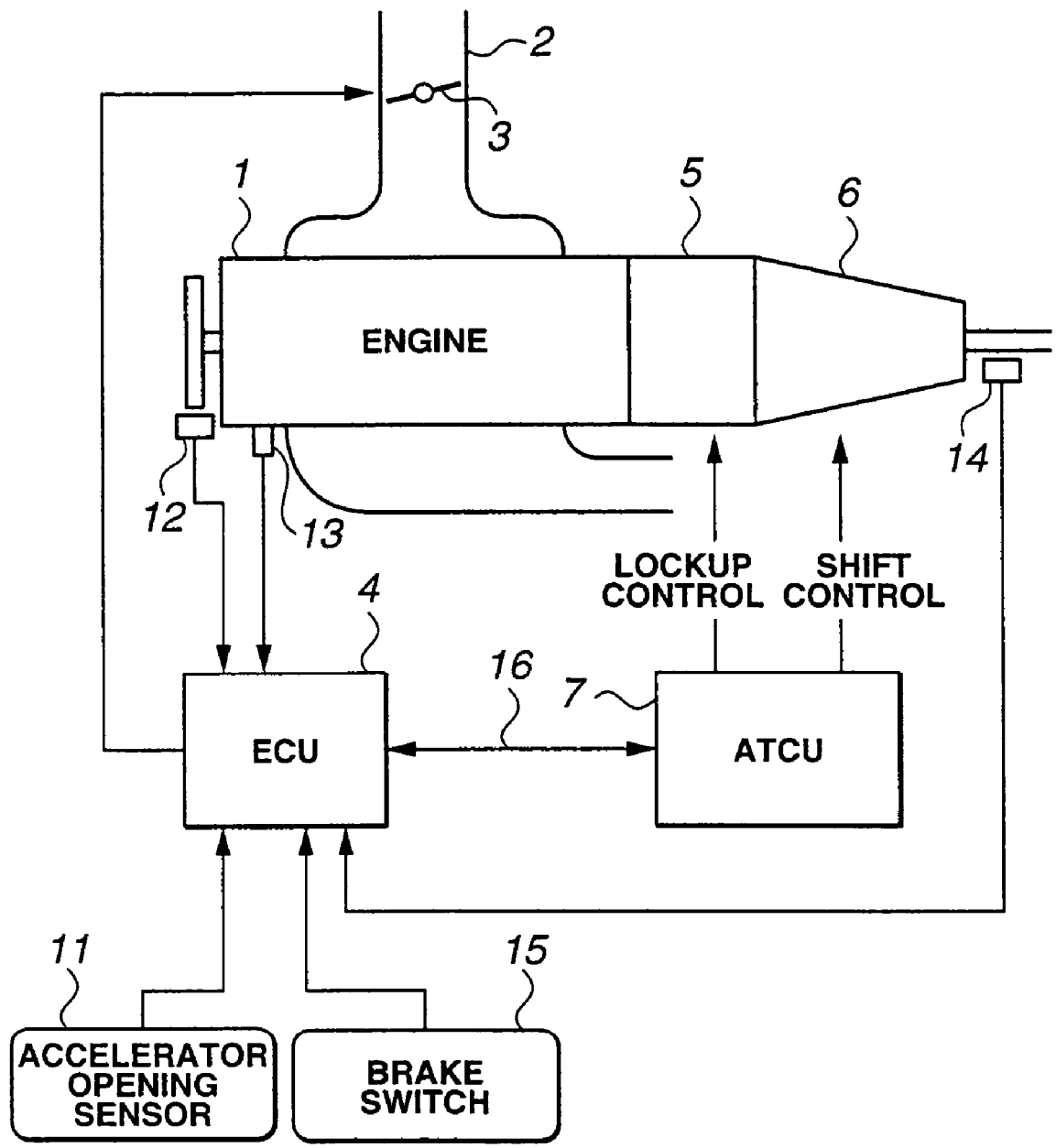
FIG. 1 is a schematic view showing an engine system which employs an engine deceleration control system according to an embodiment of the present invention.

Referring to the drawings, there is discussed an embodiment of an engine deceleration control system for an internal combustion engine according to the present invention.

FIG. 1 shows a schematic view showing the engine deceleration system including the internal combustion engine 1. Internal combustion engine 1 of a vehicle comprises an electromotive throttle valve (throttle by wire) 3 for controlling a supplied air quantity (airflow rate) to engine 1. Electromotive throttle valve 3 is provided in an intake passage 2 of engine 1 and is controlled by an engine control unit (ECU) 4. Although illustration of a fuel supply line for engine 1 is omitted herein, ECU 4 is arranged to control the fuel supply quantity relative to the supplied air quantity so as to achieve a desired air-fuel ratio.

An output shaft of engine 1 is connected to an automatic transmission 6 via a torque converter 5 equipped with a lockup clutch. An AT control unit (ATCU) 7 executes a shift control of an automatic transmission 6 and ON-OFF control (lockup control) of the lockup clutch of torque converter 5.

ECU 4 receives an accelerator opening signal from an accelerator opening sensor 11 which detects a depression quantity (accelerator opening) APO of an accelerator pedal. An idle switch signal is capable of being generated from accelerator opening signal APO. Further, ECU 4 receives a crank angle signal (REF, POS) from a crank angle sensor 12. An engine speed Ne of engine 1 is capable of being generated from crank angle sensor 12. Further, ECU 4 receives a coolant temperature indicative signal from a coolant temperature sensor 13 for detecting a coolant temperature Tw of engine 1.

Furthermore, ECU 4 receives a vehicle speed indicative signal from a vehicle speed sensor 14 for detecting a vehicle speed (revolution speed of an output shaft of automatic transmission 6) VSP. Further, ECU 4 receives a braking indicative signal from a brake switch 15 for detecting an operating state (ON-OFF state) of a brake system from a depression state of a brake pedal (or brake hydraulic pressure) functioning as a braking means of the vehicle. Furthermore, ECU 4 receives shifting flag information indicative of a state of a shift flag which represents whether a shifting operation is being executed, and lockup execution flag information indicative of a state of a lockup flag which represents whether torque converter 5 is put in a lockup state, from ATCU 7 via wire 16.

ECU 4 executes a calculation processing of the intake air quantity (airflow rate) control on the basis of the above-mentioned received signals to control the opening of electromotive throttle valve 3.

ECU 4 mainly sets an accelerator demand air quantity (airflow rate) QAPO on the basis of accelerator opening APO and engine speed Ne. Subsequently, ECU 4 determines a final target air quantity TQ by adding an idling air quantity QISC for idling and deceleration to accelerator demand air quantity QAPO (TQ=QAPO+QISC). ECU 4 converts final target air quantity TQ into a target throttle opening and controls electromotive throttle valve 3 according to the target throttle opening. In this embodiment, idling air quantity QISC is set using the following expression (1).

$$QISC = QISCTW + QISCI + \ldots + QISCDEC \qquad (1)$$

That is, basic idling air quantity QISCTW is determined by referring to a table, which has previously defined a relationship between basic idling air quantity QISCTW and engine cooling water temperature Tw using actual water temperature Tw.

Further, when an idling speed feedback control condition is satisfied, ECU 4 determines (sets) a target idling speed Nset by referring to a table, which has previously defined a relationship between target idling speed Nset and engine coolant temperature Tw, using actual coolant temperature Tw. Further, ECU 4 compares actual idling speed Ne and target idling speed Nset. When Ne<Nset, ECU 4 increases feedback air quantity QISC by a predetermined integral quantity ΔI. When Ne>Nset, ECU 4 decreases feedback air quantity QISC by predetermined integral quantity ΔI. When the idling speed feedback condition is not satisfied, ECU 4 maintains feedback correction quantity QISCI at an initial value or previous value.

Then, ECU 4 calculates idling air quantity QISC in a manner of adding feedback air quantity QISCI to basic idling air quantity QISCTW.

On the other hand, according to the present invention, ECU 4 corrects an air quantity to be supplied to engine 1 on the basis of a deceleration ΔNe of engine 1 when engine 1 is put in a deceleration state. Therefore, the calculation expression of the idling air quantity QISC includes a deceleration correction air quantity QISCDEC. This deceleration correction air quantity QISCDEC is normally set at 0 (QISCDEC=0). When engine 1 is put in the deceleration state, ECU 4 detects deceleration ΔNe and determines deceleration correction air quantity QISCDEC according to the detected deceleration ΔNe, so that idling air quantity QISC is corrected to an increased side when engine 1 is decelerated.

Subsequently, there is discussed the calculation of deceleration ΔNe and the calculation of deceleration correction air quantity QISCDEC for the control during the engine deceleration, with reference to flowcharts in FIGS. 2 and 3.

Figure 2:
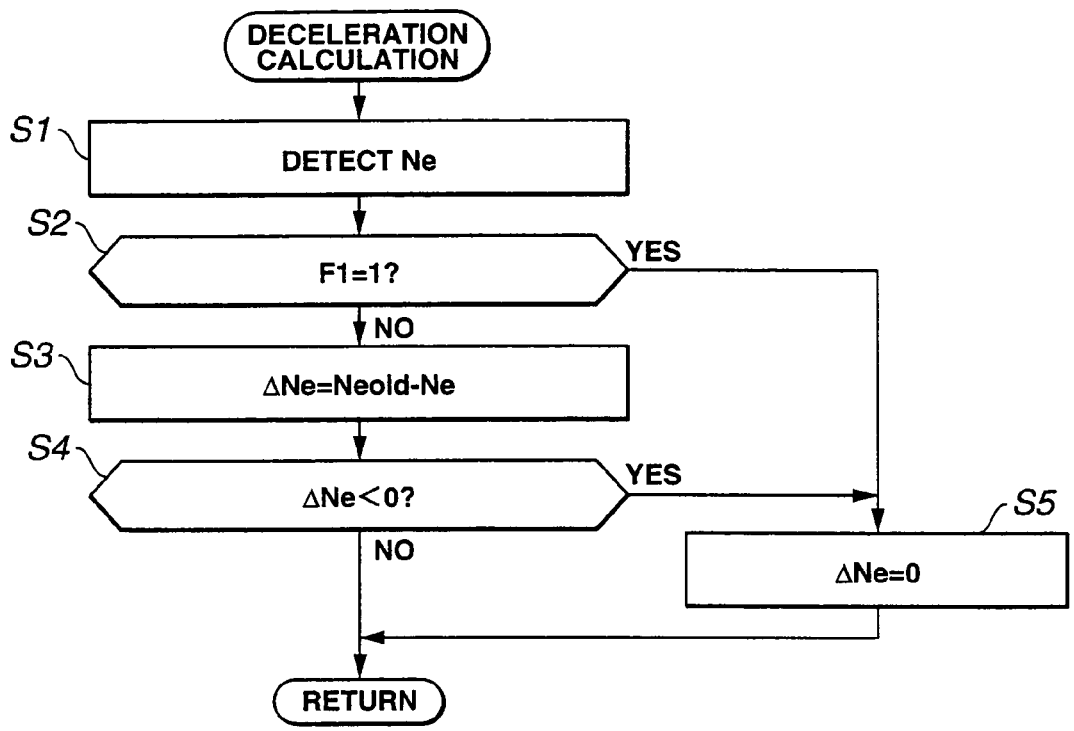
FIG. 2 is a flowchart showing an engine deceleration calculation routine employed in the embodiment according to the present invention.

FIG. 2 shows a flowchart of a deceleration calculation routine.

At step S1 ECU 4 detects engine speed Ne.

At step S2 ECU 4 determines whether or not a deceleration calculation prohibition flag F1 is set (F1=1?). When F1=1 (deceleration calculation prohibition state), the routine proceeds to step S5. When F1=0 (deceleration calculation allowed state), the routine proceeds to step S3.

At step S3 subsequent to the negative determination at step S2, ECU 4 calculates deceleration ΔNe by subtracting a present engine speed Ne from a previous engine speed $Ne_{old}$ (ΔNe=$Ne_{old}$−Ne). This step S3 corresponds to a deceleration calculating means.

At step S4 subsequent to the execution of step S3, ECU 4 determines whether or not deceleration ΔNe is smaller than zero. When the determination at step S4 is affirmative (ΔNe<0), that is, when engine speed Ne is increasing, the routine proceeds to step S5. When the determination at step S4 is negative (ΔNe>0), that is, when engine speed Ne is decreasing, the routine proceeds to a return block to terminate the present routine.

At step S5 ECU 4 sets deceleration ΔNe at zero (ΔNe=0). Then the present routine is terminated.

Referring to a flowchart in FIG. 3, there is discussed the calculation processing of the deceleration correction air quantity as follows.

At step S11 ECU 4 reads deceleration ΔNe and engine speed Ne.

At step S12 ECU 4 determines whether or not a predetermined deceleration correction condition is satisfied. Herein, the deceleration correction condition includes a condition that acceleration opening APO is zero (APO=0), that is, idling switch is put in ON state. When the determination at step S12 is affirmative, that is, when the deceleration correction condition is satisfied, the routine proceeds to step S13. On the other hand, when the determination at step S12 is negative, that is, when the deceleration correction condition is not satisfied, the routine proceeds to step S15 wherein ECU 4 sets deceleration correction air quantity QISCDEC at zero (QISCDEC=0). Then the routine proceeds to a return block to terminate the present routine.

At step S13 subsequent to the affirmative determination at step S12, ECU 4 determines whether or not a deceleration correction prohibition flag F2 is set (F2=1?). When the determination at step S13 is affirmative (F2=1), the routine proceeds to step S15. When the determination at step S13 is negative (F2=0), that is, when the deceleration correction is allowed, the routine proceeds to step S14.

At step S14 ECU 4 sets deceleration correction air quantity QISCDEC on the basis of deceleration ΔNe and engine speed Ne. More specifically, ECU 4 increases deceleration correction air quantity QISCDEC as deceleration ΔNe increases (this means large drop of engine speed Ne). Further, ECU 4 decreases deceleration correction air quantity QISCDEC as engine speed Ne decreases (this means increase of a possibility of engine stall). When deceleration ΔNe is zero (ΔNe=0), deceleration correction air quantity QISCDEC is set at zero (QISCDEC=0).

Figure 4:
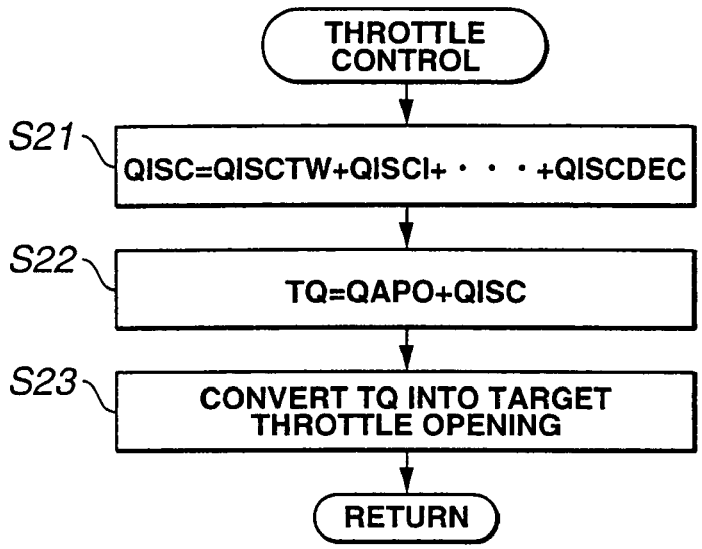
FIG. 4 is a flowchart showing a throttle control routine employed in the embodiment according to the present invention.

After deceleration correction air quantity QISCDEC is set by executing the calculation processing of the deceleration correction air quantity as discussed above, ECU 4 executes a throttle control routine shown by a flowchart in FIG. 4.

At step S21 ECU 4 calculates idling air quantity QISC by adding deceleration correction air quantity QISCDEC together with basic idling air quantity QISCTW and feedback air quantity QISCI using the expression (1).

At step S22 ECU 4 calculates final target air quantity TQ by adding accelerator demand air quantity QAPO and idling air quantity QISC (TQ=QAPO+QISC).

At step S23 ECU 4 converts final target air quantity TQ into the target throttle opening, and controls the opening of throttle valve 3 at the target throttle opening. Then, the routine proceeds to a return block to terminate the present throttle control routine.

Figure 5:
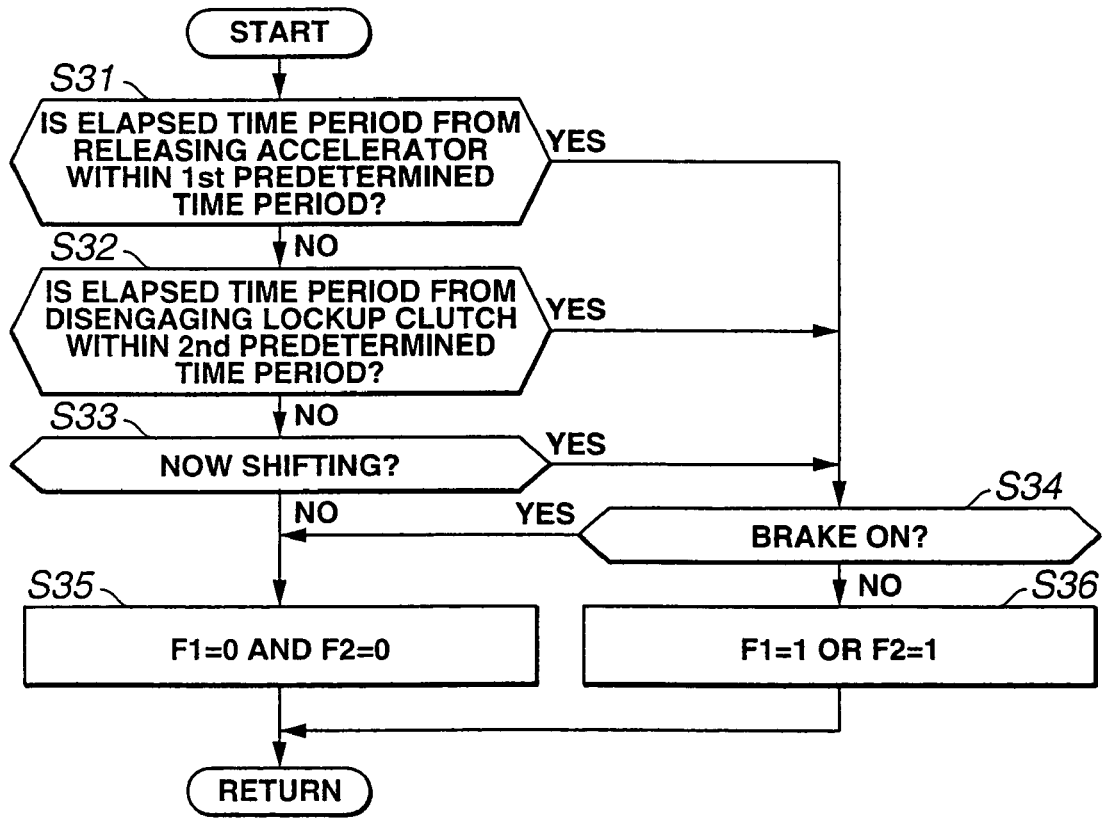
FIG. 5 is a flowchart showing an allowance and prohibition determination routine employed in the embodiment according to the present invention.

FIG. 5 shows a flowchart of an allowance/prohibition determination routine for determining allowance/prohibition of the deceleration calculation or deceleration correction (calculation of deceleration correction air quantity).

At step S31 ECU 4 determines whether or not the accelerator was put in off state (ON→OFF) just or within a first predetermined time period, that is, whether a time period elapsed from a moment of releasing the accelerator pedal is within the first predetermined time period. This turning-off of the accelerator is determined on the basis of the signal of the accelerator opening sensor (or idling switch) 11. This first predetermined time period is basically determined from a longer time of a time period necessary for decreasing engine speed Ne after the turning-off of the accelerator, engine speed Ne is decreased until being balanced according to the vehicle speed and the gear position, and a time period necessary for masking the shifting time period for upshift. This first predetermined time period is set in order to prevent an erroneous determination that a drop of engine speed Ne due to the turning off of accelerator or a drop of engine speed Ne due to upshift after the turning off of accelerator is recognized as a radical deceleration. Accordingly, the first predetermined time period is determined upon taking account of a vehicle type, a time period necessary for executing upshift of automatic transmission 6, and a characteristic of engine including a durability against engine stall. For example, the first predetermined time period is set at 1 second when the vehicle equipped with the system according to the present invention is a pickup truck which is 2600 kg weight and is equipped with a 5.6-liter engine and a 5-speed automatic transmission. When the determination at step S31 is negative, the routine proceeds to step S32.

At step S32 ECU 4 determines whether or not the lockup clutch was disengaged just or within a second predetermined time period, that is, whether a time period elapsed from a moment of disengaging the lockup clutch is within the second predetermined time period. This disengagement of the lockup clutch is detected on the basis of a change of the lockup flag. The second predetermined time period is basically determined from a longer time of a time period necessary for disengaging the lockup clutch and a time period necessary for dropping engine speed Ne varied by disengaging the lockup clutch. This second predetermined time period is set in order to prevent an erroneous determination that a drop of engine speed Ne due to the disengagement of the lockup clutch is recognized as a radical deceleration. Accordingly, the second predetermined time period is determined upon taking account of a vehicle type, a time period necessary for disengaging the lockup clutch, and the characteristic of engine including a durability, against engine stall. As is similar to step S31 the second predetermined time period is set at 1 second when the vehicle equipped with the system according to the present invention is a pickup truck which is 2600 kg weight and is equipped with a 5.6-liter engine and a 5-speed automatic transmission. When the determination at step S32 is negative, the routine proceeds to step S33

At step S33 ECU 4 determines whether or not the shifting of automatic transmission 6 is executed now. This shifting state of automatic transmission 6 is determined on the basis of the state of the shift flag. When the determination at step S33 is negative, the routine proceeds to step S35.

That is, when all determinations at steps S31, S32 and S33 are negative, ECU 4 determines that there is no problem in execution of the deceleration calculation, and therefore the routine proceeds to step S35.

At step S35, ECU 4 sets deceleration calculation prohibition flag F1 at zero (F1=0) to allow the execution of the deceleration calculation, and sets deceleration correction prohibition flag F2 at zero (F2=0) to allow the execution of the deceleration correction.

On the other hand, when the determination at one of steps S31, S32 and S33 is affirmative, the routine proceeds to step S34.

At step S34 ECU 4 determines whether or not the brake system is operating, on the basis of the brake switch signal. When the determination at step S34 is affirmative, it is predicted that engine speed Ne will radically drop due to the braking operation. Therefore, when the determination at step S34 is affirmative, the routine proceeds to step S35.

On the other hand, when the determination at step S34 is negative, that is, when the brake system is not being executed, ECU 4 determines that the engine stall does not occur although the turning off of the accelerator or the disengagement of the lockup clutch or shifting may temporarily drop engine speed Ne. Therefore, when the determination at step S34 is negative, the routine proceeds to step S36 wherein ECU 4 sets deceleration calculation prohibition flag F1 at 1 (F1=1) to prohibit the execution of the deceleration calculation or sets deceleration correction prohibition flag F2 at 1 (F2=1) to prohibit the execution of the deceleration calculation.

When the calculation of deceleration ΔNe is prohibited by setting deceleration calculation prohibition flag F1 at 1 (F1=1), the following processing is executed.

In the deceleration calculation routine in FIG. 2, the flag determination at step S2 makes the affirmative determination due to F1=1, and therefore the routine proceeds to step S5 wherein deceleration is set at zero (ΔNe=0).

Figure 3:
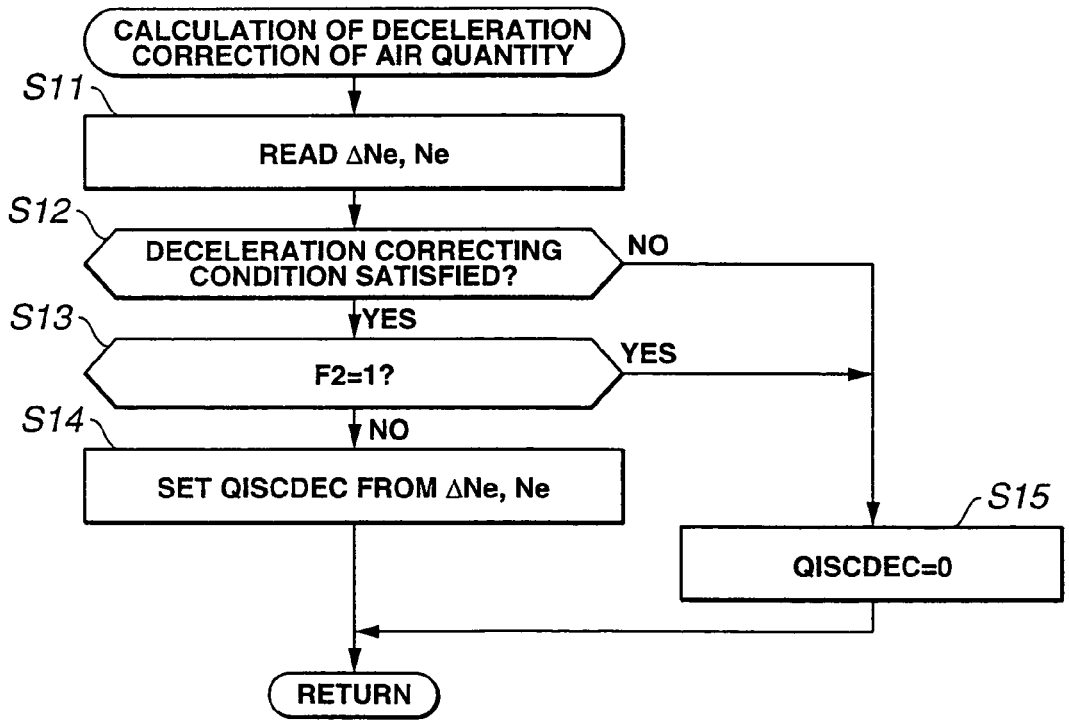
FIG. 3 is a flowchart showing a deceleration correction air quantity calculation routine employed in the embodiment according to the present invention.

In the deceleration correction air quantity calculation routine in FIG. 3, the routine proceeds to step S14 wherein deceleration correction air quantity QISCDEC is calculated from deceleration ΔNe and engine speed Ne. Since deceleration is set at zero (ΔNe=0), deceleration correction air quantity QISCDEC takes zero (QISCDEC=0). Therefore, the deceleration correction is substantially not executed. This indirectly prohibits the deceleration correction by the prohibition of the deceleration calculation.

When the deceleration correction is prohibited by setting deceleration correction prohibition flag F2 at 1 (F2=1), the following processing is executed.

In the deceleration calculation routine in FIG. 2, the routine proceeds to step S3 wherein deceleration ΔNe is calculated.

However, in the deceleration correction air quantity calculation routine in FIG. 3, step S13 makes the affirmative determination due to F2=1, and therefore the routine proceeds to step S15 wherein deceleration correction air quantity QISCDEC is set at zero (QISCDEC=0) so as not to execute the deceleration correction. Accordingly, the deceleration correction is directly prohibited.

Figure 6:
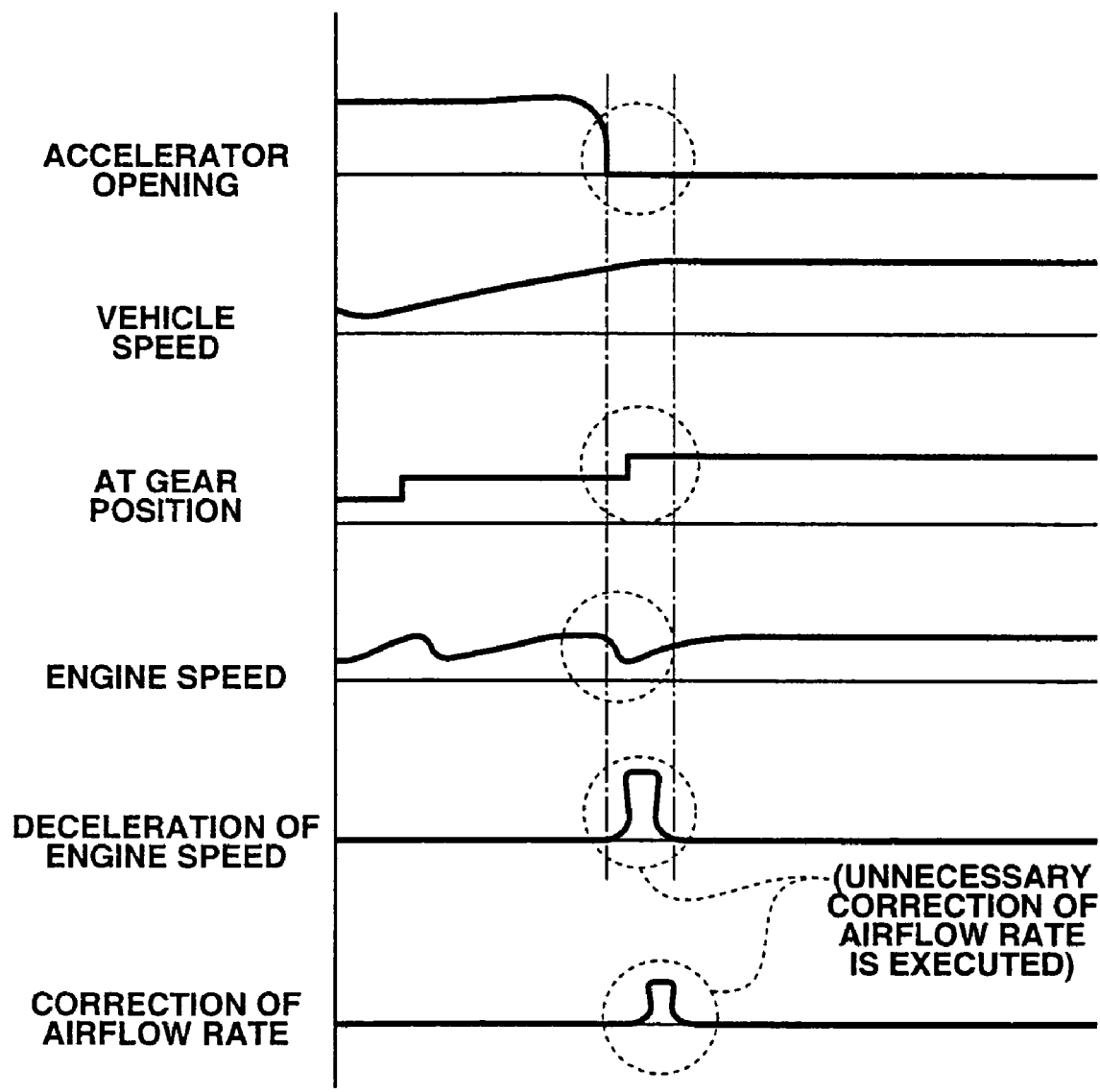
FIG. 6 is time charts showing an engine operating condition of a commonly known engine system during a temporal engine speed dropping state.

FIG. 6 shows an operation executed by a deceleration control, which is a comparative example of the engine deceleration control according to the present invention. When an engine speed largely drops just after the accelerator pedal is released so as to turn off the accelerator switch, it is determined that the drop of the engine speed is due to the radical deceleration although actually it is due to the upshift of an automatic transmission. That is, although there is no risk of engine stall, the increase correction of the supplied air quantity is executed on the basis of this deceleration. This results in the degradation of the fuel consumption of the vehicle.

Figure 7:
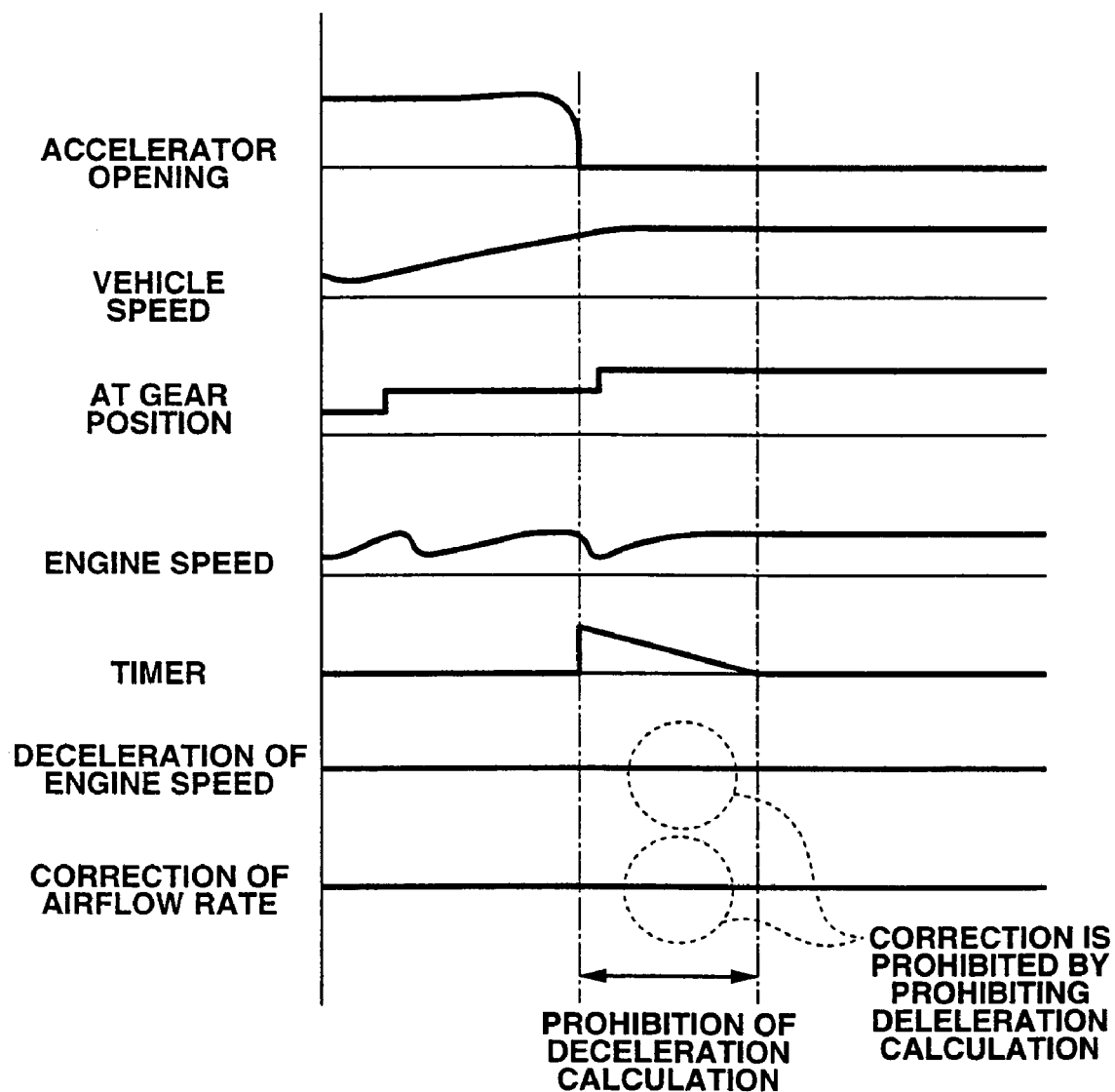
FIG. 7 is time charts showing an engine operating condition of the engine system employing the engine deceleration control system according to the present invention during a temporal engine speed dropping state.
Figure 8:
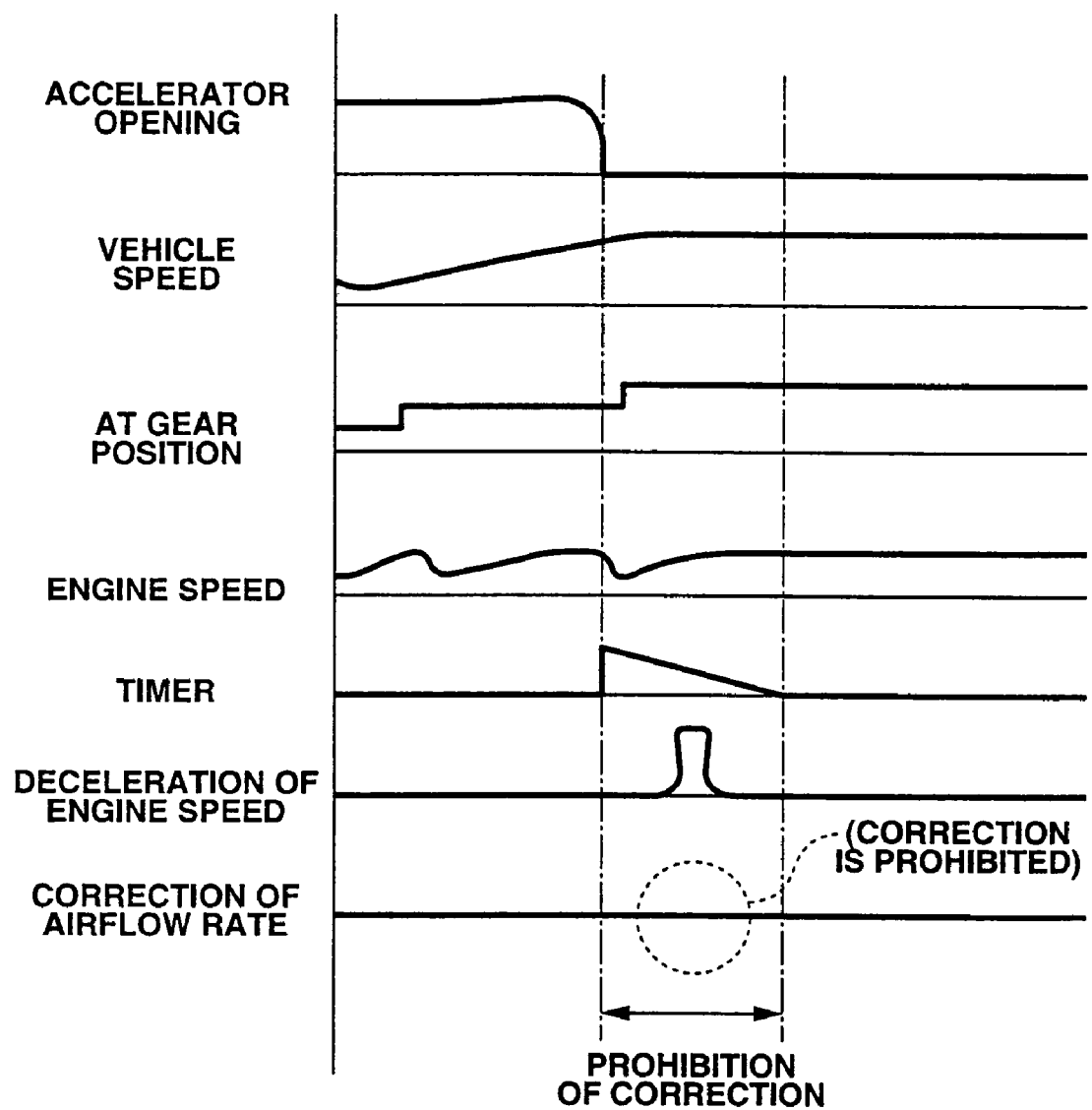
FIG. 8 is time charts showing another engine operating condition of the engine system employing the engine deceleration control system according to the present invention during a temporal engine speed dropping state.

FIGS. 7 and 8 show the operation in case that the engine deceleration control system according to the present invention is employed in the engine system. In this case according to the present invention, even when engine speed Ne is dropped due to the upshift of automatic transmission 6, by substantially prohibiting the air quantity correction through the prohibition of the deceleration within the first predetermined time period as shown in FIG. 7, or by directly prohibiting the air quantity correction as shown in FIG. 8, the fuel supply to engine 1 is not changed and therefore the degradation of the fuel consumption is prevented.

According to the present invention, the calculation of deceleration ΔNe and the deceleration correction of the air quantity are executed out of the predetermined time period just after the accelerator is released so as to turn off the accelerator switch. Therefore it becomes possible to prevent the degradation of the fuel consumption due to the increase of the supplied air quantity in the a case such that there is no risk of engine stall such as a case of the turn off operation of the accelerator switch and the upshift just after the turn off of the accelerator switch.

Further, according to the present invention, the calculation of deceleration ΔNe and the deceleration correction of the air quantity are executed at a period except for the predetermined time period just after the lockup clutch is released. Therefore it becomes possible to finely prevent the degradation of the fuel consumption due to the increase of the supplied air quantity in a case that there is no risk of engine stall during the predetermined time period just after the release of the lockup clutch.

Furthermore, according to the present invention, the deceleration calculation and the deceleration correction of the air quantity are executed except when the shifting of the automatic transmission is executed. Therefore, it becomes possible to finely prevent the degradation of the fuel consumption due to the increase of the supplied air quantity in a case such that there is no risk of engine stall. However, if the braking operation through the brake pedal is executed, the calculation of the deceleration ΔNe and the deceleration correction are restarted even during the above discussed predetermined period. Therefore, even if a radical braking is executed just after the turning off of the accelerator switch, the engine stall is firmly prevented.

Further, according to the present invention, it is possible to execute the prohibition of the deceleration correction indirectly by prohibiting the calculation of the deceleration or directly by prohibiting the calculation of deceleration correction without prohibiting the calculation of the deceleration.

Although the embodiment according to the present invention has been shown and described to be applied to an engine system equipped with an electromotive throttle valve 3, the invention is not limited to this. For example, when the invention is adapted to an engine system having a mechanical throttle valve and an idling control value provided at an auxiliary air passage bypassing the throttle value, an opening of the idling control valve may be controlled on the basis of the idling air quantity QISC obtained at step S21 in FIG. 4. Further, in this case, it is possible to detect the turn off of accelerator switch on the basis of a change of the opening of the mechanical throttle valve (change to the full close position).

This application is based on prior Japanese Patent Application No. 2002-306204. The entire contents of the Japanese Patent Application No. 2002-306204 with a filing date of Oct. 21, 2002 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An engine deceleration control system for an internal combustion engine of a vehicle, comprising:
    a controller arranged,
        to detect a deceleration of the engine on the basis of an engine speed,
        to correct an air quantity supplied to the engine on the basis of the deceleration when the engine is decelerated,
        to prohibit correcting the air quantity for a first predetermined time period from a moment when a state of an accelerator of the engine is changed from an operative state to an inoperative state, and to cancel prohibiting the correction of the air quantity when a braking system of the vehicle is put in an operative state.

2. The engine deceleration control system as claimed in claim 1, wherein the first predetermined time period is a longer time of a time period necessary for decreasing the engine speed after the accelerator is put in inoperative state and a shifting time period for upshift.

3. The engine deceleration control system as claimed in claim 1, wherein the controller is further arranged to prohibit correcting the air quantity during a shifting of a transmission connected to the engine.

4. The engine deceleration control system as claimed in claim 1, wherein the controller is further arranged to prohibit correcting the air quantity when a brake system of the vehicle is put in an inoperative state.

5. The engine deceleration control system as claimed in claim 1, wherein the controller is further arranged to prohibit correcting the air quantity by prohibiting the detection of the deceleration.

6. The engine deceleration control system as claimed in claim 1, wherein the controller is further arranged to prohibit correcting the air quantity for a second predetermined time period from a moment when a lockup clutch of a torque converter, which is disposed between the engine and a transmission, is disengaged.

7. The engine deceleration control system as claimed in claim 2, wherein the second predetermined time period is a longer time of a time period necessary for disengaging the lockup clutch and a time period necessary for dropping the engine speed varied by disengaging the lockup clutch.

8. An engine deceleration control system for an internal combustion engine of a vehicle, comprising:
an engine speed detector detecting an engine speed of the engine;
an air quantity control device controlling an air quantity supplied to the engine;
an accelerator operation detector detecting an operating state of an accelerator of the engine;
a brake operation detector detecting that a brake pedal is depressed; and
a controller connected to the engine speed detector, the air quantity control device and the acceleration operation detector and the brake operation detector, the controller being arranged,
to detect an engine deceleration on the basis of a variation of the engine speed,
to correct the air quantity on the basis of the engine deceleration,
to prohibit correcting the air quantity when one of first, second and third conditions is satisfied where the first condition is a condition that an elapsed time period from a moment of turning off of an accelerator of the engine is within a first predetermined time period, the second condition is a condition that an elapsed time period from a moment of turning off of a lockup clutch of a torque converter is within a second predetermined time period, and the third condition is a condition that a shifting of a transmission connected to the engine is executed, and
to cancel prohibiting the correction of the supplied air quantity when a braking operation is executed.

9. An engine deceleration control system for an internal combustion engine, comprising:
deceleration detecting means for detecting a deceleration of the engine on the basis of an engine speed of the engine;
air quantity correcting means for correcting an air quantity supplied to the engine on the basis of the deceleration when the engine is decelerated;
correction prohibiting means for prohibiting the correction of the air quantity during a predetermined time period from a moment that an accelerator is put in an Off state; and
correction prohibiting canceling means for canceling the correction prohibition when a braking operation is executed.

10. A method of controlling a deceleration of an internal combustion engine, comprising:
detecting a deceleration of the engine on the basis of a drop quantity of an engine speed of the engine;
correcting an air quantity supplied to the engine on the basis of the deceleration when the engine is decelerated;
prohibiting correcting the air quantity during a predetermined time period from a moment that an engine accelerator is put in an Off state; and
canceling prohibiting the correction when a braking operation is executed.

* * * * *